US007577465B2

(12) United States Patent
Cheng et al.

(10) Patent No.: US 7,577,465 B2
(45) Date of Patent: Aug. 18, 2009

(54) SLIDABLE BLUETOOTH EARPHONE STRUCTURE

(75) Inventors: Yu-Chang Cheng, Sindian (TW); Tse-Ming Tsai, Sindian (TW); Chen-Yi Hsiao, Sindian (TW)

(73) Assignees: Cal-Comp Electronics & Communications Company, Ltd., Taipei County (TW); Kinpo Electronics, Inc., Taipei (TW)

( * ) Notice: Subject to any disclaimer, the term of this patent is extended or adjusted under 35 U.S.C. 154(b) by 126 days.

(21) Appl. No.: 11/727,667

(22) Filed: Mar. 28, 2007

(65) Prior Publication Data

US 2008/0159580 A1 Jul. 3, 2008

(30) Foreign Application Priority Data

Dec. 27, 2006 (TW) .............................. 95222959 U

(51) Int. Cl.
*H04M 1/00* (2006.01)

(52) U.S. Cl. ................. 455/575.2; 455/575.4; 381/374; 381/376

(58) Field of Classification Search ... 455/575.1–575.9; 379/433.11, 433.12; 292/137, 145, 146, 292/150, 302; 70/85
See application file for complete search history.

(56) References Cited

U.S. PATENT DOCUMENTS

| | | | | |
|---|---|---|---|---|
| 5,612,692 | A * | 3/1997 | Dugas et al. | 341/22 |
| 5,705,975 | A * | 1/1998 | Serino et al. | 340/426.34 |
| 2008/0070651 | A1 * | 3/2008 | Ong et al. | 455/575.4 |

FOREIGN PATENT DOCUMENTS

| | | |
|---|---|---|
| TW | 540946 | 7/2003 |

* cited by examiner

*Primary Examiner*—Rafael Prez-Gutiérrez
*Assistant Examiner*—Jalaleddin Amirmokri
(74) *Attorney, Agent, or Firm*—Rosenberg, Klein & Lee

(57) ABSTRACT

A slidable Bluetooth earphone includes a main body having a first body with an accommodating space in which a sound transmission device is mounted, a pair of positioning pieces being oppositely protruded from both lengthwise sides of the first body, a second body being formed at a front end of the first body, a resilient arm being formed at each of opposite sides of the second body in a manner to extend backward to the positioning piece, a flange being formed on a bottom of the resilient arm, and a sliding mechanism being mounted between the first body and the second body; a pressing element, mounted on the first body; and a connector, having a main axis penetrating both sides of the first body.

9 Claims, 8 Drawing Sheets

SLIDABLE BLUETOOTH EARPHONE STRUCTURE

BACKGROUND OF THE PRESENT INVENTION

1. Field of the Present Invention

The present invention generally relates to a slidable Bluetooth earphone, and more particularly to a slidable Bluetooth earphone on each side of which there is a sliding mechanism driven by a connector that allows a user to easily and precisely operate the sliding function of the earphone.

2. Description of the Related Art

A conventional earphone, as shown in TW Patent No. 540946 published on Jul. 1, 2003, discloses a held-free earphone having a length-adjustable sound receiver. The above earphone includes a sound player having a speaker inside thereof. The speaker has a wire extended from the sound player to an external electronic device. An extrusion having an engaging element thereon is formed on an outer part of the sound player. The earphone further has a hollow rectangular body, one end of which is pivotally connected to the speaker. The rectangular body has a switch on its back to control the switch of the earphone. A hanger with a curved shape, matching the shape of human's ear, has a first end embedded on the engaging element on the protrusion of the sound player, and a second end which can be hung on a user's ear in a manner that one face of the sound player contacts the user's ear. An exposed and length-adjustable sound receiver is detachably mounted on the other end of the rectangular body. A microphone is mounted inside the receiver and extends toward one end of the rectangular body until it reaches an interior of the sound player. Another wire is provided for receiving the user's voice.

In the above structure, when the user manually adjusts the length of the sound receiver, it tends to loosen the hanger which then needs to be hung over and over again, resulting in much inconvenience to the user.

SUMMARY OF THE PRESENT INVENTION

It is an object of the present invention to provide a slidable Bluetooth earphone, in which sliding mechanisms on both sides of the earphone cooperate with a connector so that a user can precisely and comfortably operate the sliding function of the slidable Bluetooth earphone of the invention. A retainer is configured to stop any unintentional activation of the sliding mechanism.

In order to achieve the above and other objectives, the slidable Bluetooth earphone of the present invention includes a main body, having a first body with an accommodating space therein. The accommodating space has a sound transmission device mounted inside thereof, a pair of positioning pieces oppositely protrude from both lengthwise sides of the first body. A second body is formed at a front end of the first body, a resilient arm is formed on each opposite side of the second body and extends backward to the positioning piece. A flange is formed on a bottom of the resilient arm, and a sliding mechanism is mounted between the first body and the second body. A pressing element is mounted on the first body wherein a stopping piece extends downward from the pressing element along each lengthwise side of the first body. There are two rotating pieces, respectively pivotally connected to the sides of the first body, wherein a first rotatable arm extends forward from a front end of the rotating piece and is located under the resilient arm. A second rotatable arm extends backward from a rear of the rotating piece and is located just under the stopping piece and in the movement path of the pressing element. There is also a connector, having a main axis penetrating both sides of the first body, wherein a stopping rod extends from each end of the main axis and is located between the stopping piece and the second rotatable arm. Two shields are respectively mounted on either side of the main body, wherein an operational hole is formed through one of the shields. Furthermore, there is a retainer, formed on one side of the first body and received by the operational hole of the shield in a manner that allows it to move relative to the first body. Next, there is a driven-to-move piece that protrudes from the retainer to penetrate through the operational hole. A retaining face is formed on a bottom of the retainer. The retaining face comes close to the resilient arm as the retainer slides over an upper end of the resilient arm, which is located on the same side as where the retaining face is formed.

In such a structure, the retainer limits the operation of the resilient arm, preventing the resilient arm from being bumped due to pushing forces exerted by the first rotatable arm. After the retainer releases the resilient arm, the operator can press the pressing element down to push the stopping piece of the pressing element on any side of the pressing element against the stopping rod thereunder, thereby driving the connector to rotate. At this time the stopping rod simultaneously presses down against the corresponding second rotatable arm. The rotating piece is then driven to rotate to push the first rotatable arm upward against the respective second arm. Therefore the flange of the resilient arm is withdrawn from the positioning piece and subsequently the second body is released from the retained position. Thus, the sliding mechanism enables the second body to slide toward the first body.

To provide a further understanding of the present invention, the following detailed description illustrates embodiments and examples of the present invention, this detailed description being provided only for illustration of the present invention.

DETAILED DESCRIPTION OF THE EMBODIMENTS

Figure 1:
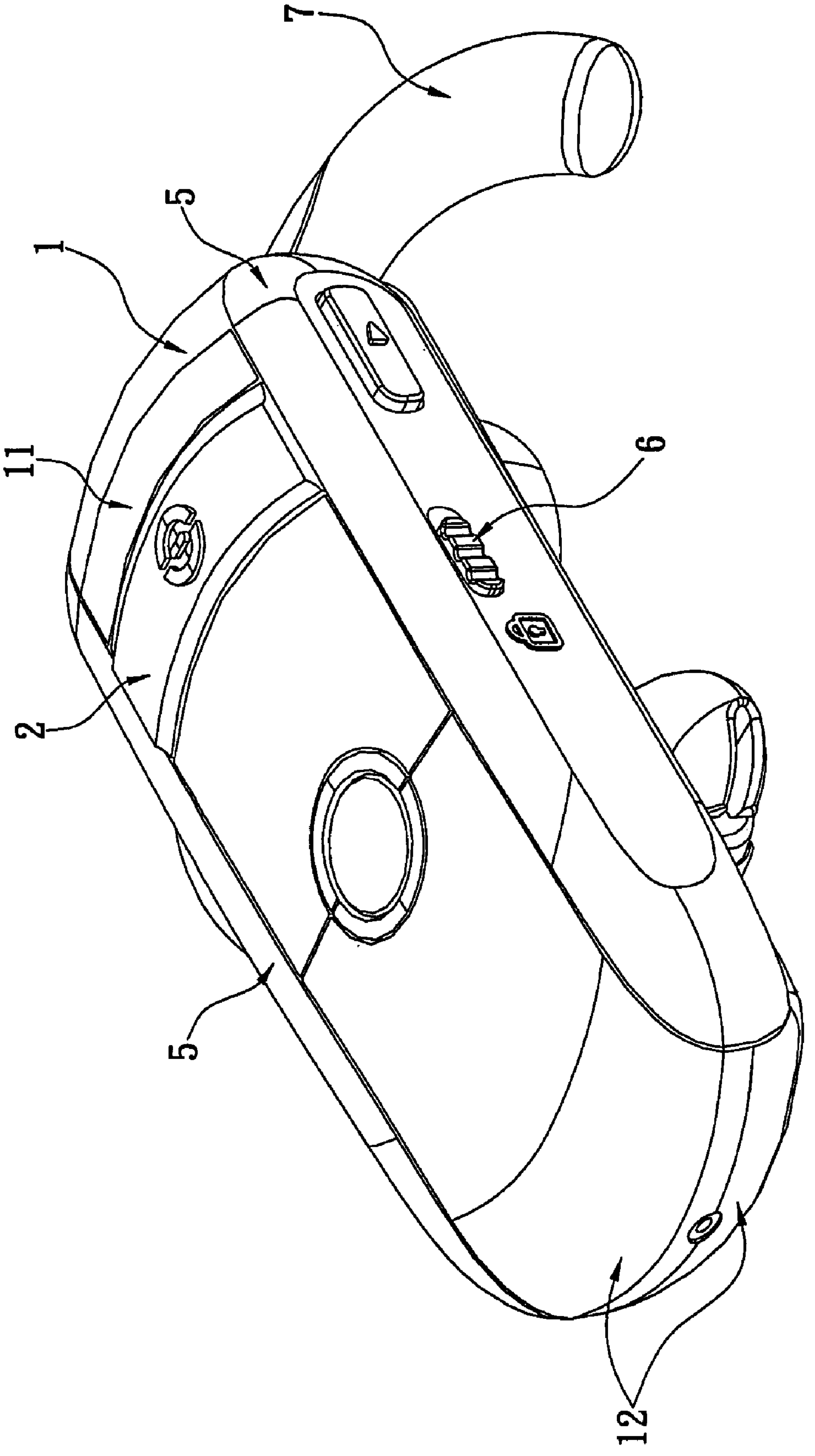
FIG. 1 is a perspective view of a slidable Bluetooth earphone structure according to one embodiment of the invention.

Wherever possible in the following description, like reference numerals will refer to like elements and parts unless otherwise illustrated.

Figure 2:
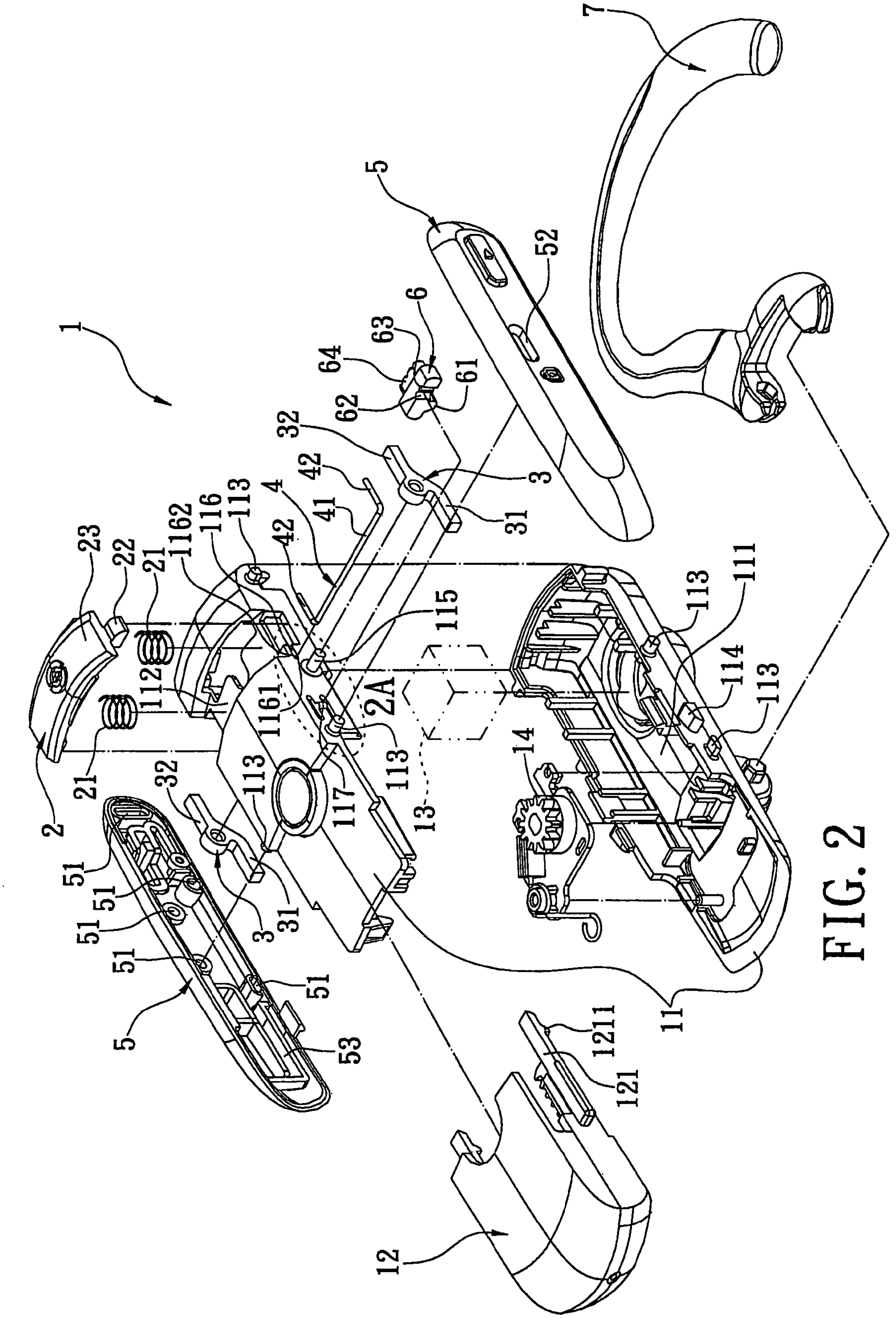
FIG. 2 is a schematic, exploded view of a slidable Bluetooth earphone structure according to one embodiment of the invention.
Figure 2A:
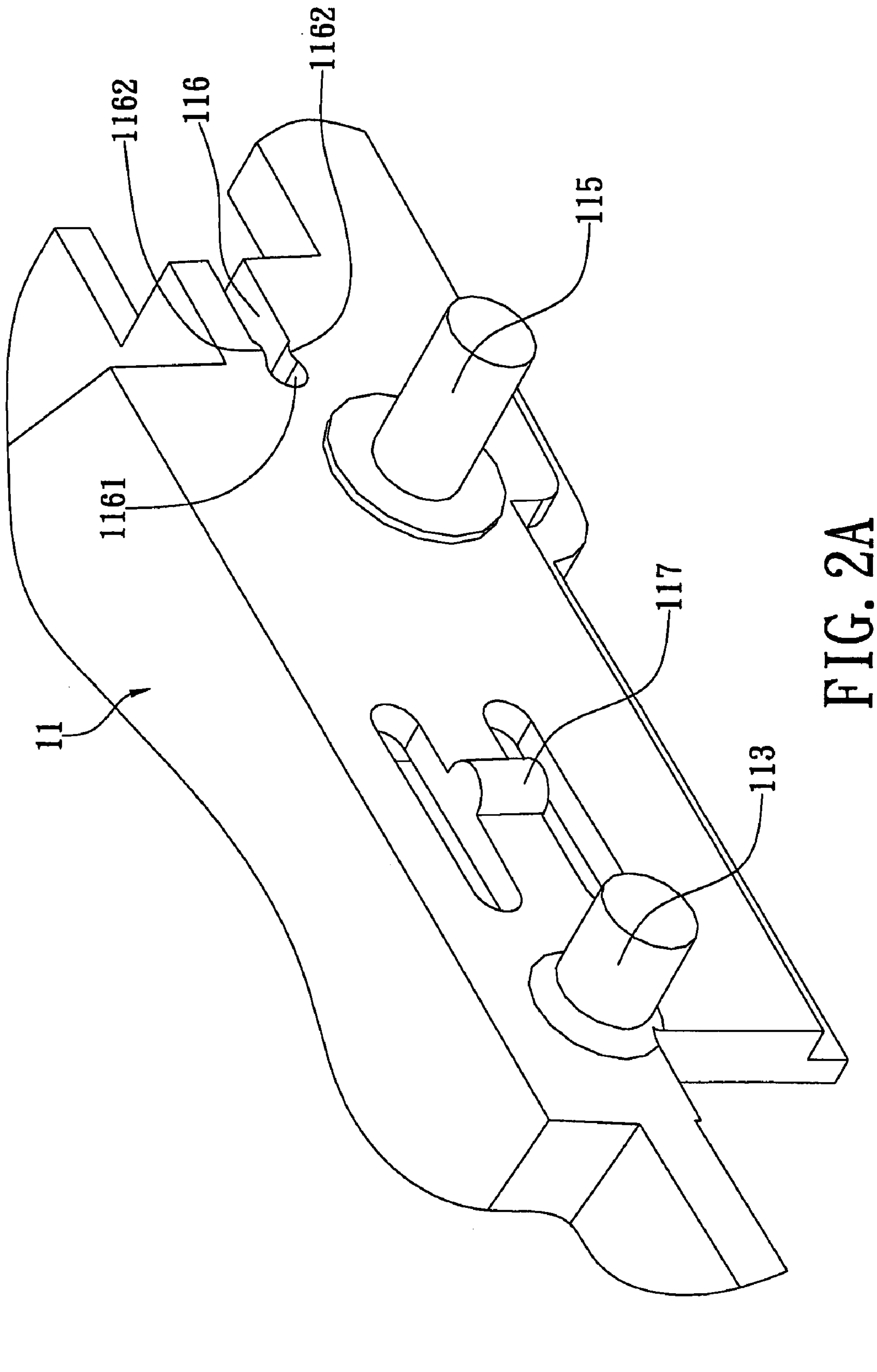
FIG. 2A is a schematic, enlarged view of a slidable Bluetooth earphone structure according to one embodiment of the invention.
Figure 3:
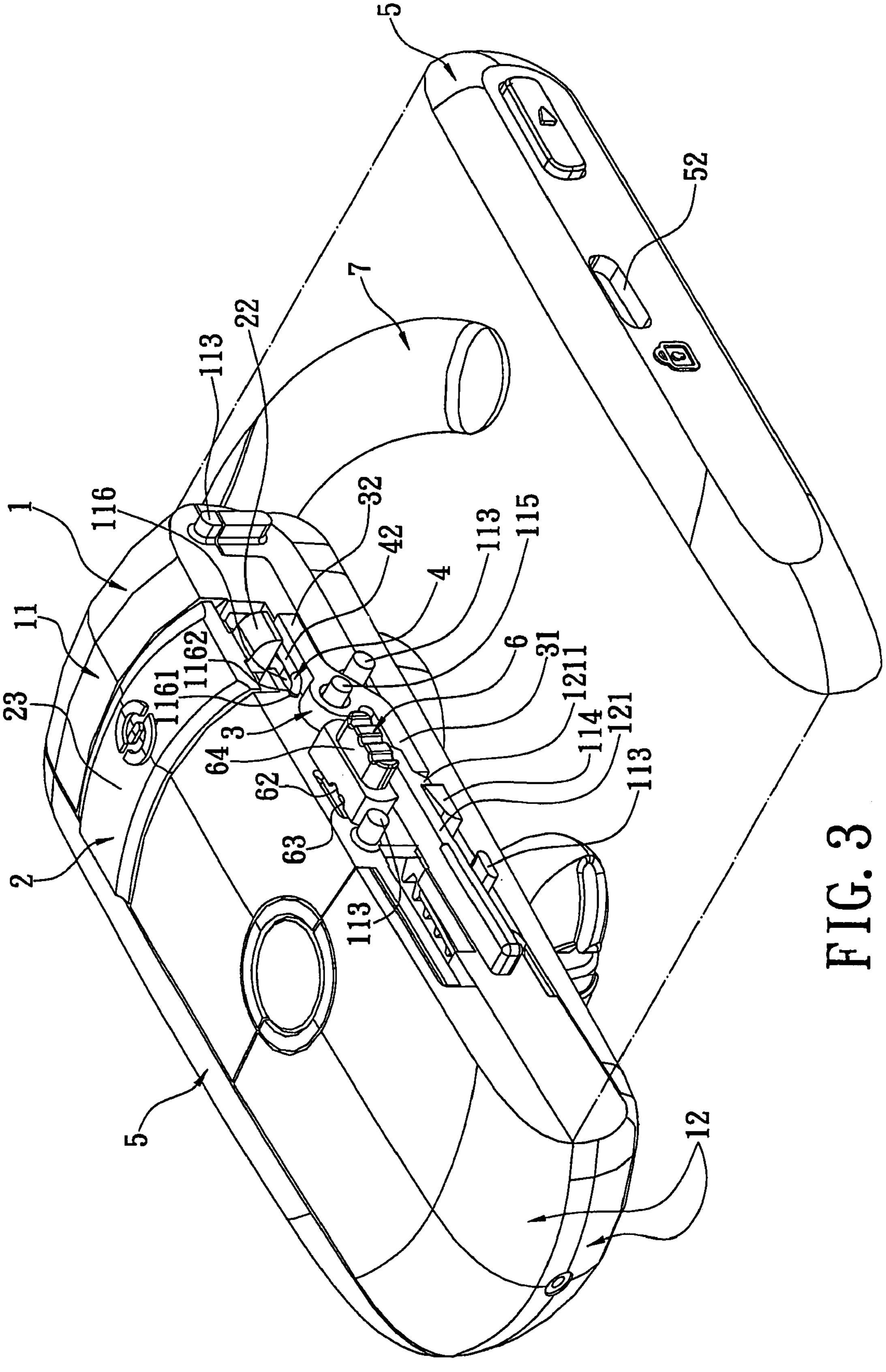
FIG. 3 is a schematic, exploded view of a part of a slidable Bluetooth earphone structure according to one embodiment of the invention.

First, referring to FIG. 1, FIG. 2, FIG. 2A and FIG. 3, the slidable Bluetooth earphone of the present invention includes a main body 1, a pressing element 2, two rotating pieces 3, a connector 4, two shields 5, a retainer 6, and a holder 7.

The main body 1 has a first body 11 with an accommodating space 111. The accommodating space 111 has a sound transmission device 13 mounted inside thereof. A receiving slot 112 is formed on a top of the first body 11. A plurality of fixing pieces 113 is formed on both lengthwise sides of the first body 11. A pair of positioning pieces 114 is oppositely protruded from both lengthwise sides of the first body 11. A stub 115 is formed behind each of the positioning pieces 114. A pair of sliding holes 116 is oppositely formed on both lengthwise sides of the first body 11. A movable space 1161 is formed at one end of the sliding hole 116. A pair of positioning protrusions 1162 is oppositely formed on each inner side of the sliding hole 116 close to the movable space 1161. A positioning rib 117 is formed on one side of the first body 11.

A second body 12 is formed at a front end of the first body 11. A resilient arm 121 is formed on each of opposite side of the second body 12. The resilient arm 121 extends backward to the positioning piece 114. A flange 1211 is formed on a bottom of the resilient arm 121, corresponding to a rear of the positioning piece 114. A sliding mechanism 14 is mounted between the first body 11 and the second body 12.

The pressing element 2 is mounted inside the receiving slot 112 of the first body 11. A pressing face 23 is formed on a top of the pressing element 2. Two anti-pressing springs 21 are mounted between the pressing element 2 and the receiving slot 112 of the first body 11 as a resilient anti-pressing unit to provide upward anti-force to the pressing element 2 pressing against the first body 11. A stopping piece 22 extends downward from the pressing element 2 along each lengthwise side of the first body 11.

Two rotating pieces 3 are respectively pivotally connected to the stubs 115 on the sides of the first body 11. A first rotatable arm 31 extends forward from a front end of the rotating piece 3 and is located under the resilient arm 121. A second rotatable arm 32 extends backward from a rear of the rotating piece 3 and is located just under the stopping piece 22 and in the movement path of the pressing element 2.

The connector 4 has a main axis 41 penetrating through the two sliding holes 116 of the first body 11. The main axis 41 slides along the slidable hole 116 to pass the two positioning protrusions 1162 to stop by/and stops inside the movable space 1161. A stopping rod 42 extends from each end of the main axis 41 and is located between the stopping piece 22 and the second rotatable arm 32.

Two shields 5 respectively shield each opposite side of the first body 11 of the main body 1 and extend to cover both sides of the second body 12. A plurality of fixing slots 51 is formed on the shields 5 so as to receive the respective fixing pieces 113. One of the shields 5 has an operation hole 52, and the operation hole 52 is located at the same side where the positioning rib 117 is located. A limiting slot 53 is formed on each of the shields 5 opposite to the second body 12 in a manner to receive the resilient arm 121 on the second body 12.

The retainer 6 is formed on one side of the first body 11 and is received by the operational hole 52 of the shield 5 in a manner that allows movement relative to the first body 11. A retaining face 61 is formed on a bottom of the retainer 6. The retaining face 61 comes to close to the resilient arm 121 as the retainer 6 slides over an upper end of the resilient arm 121 which is located on the same side as where the retaining face 61 is formed. A first slot 62 is formed in the retainer 6 opposite to the first body 11 but corresponding to the positioning rib 117. A second slot 63 is formed opposite to the first slot 62. As soon as the first slot 62 engages with the positioning rib 117, the retainer 6 is positioned at an upper end of the resilient arm 121 to drive the retaining face 61 to be close to the resilient arm 121. As soon as the second slot 63 engages with the positioning rib 117, the retainer 6 departs from the upper end of the resilient arm 121 so as to drive the retaining face 61 to depart from the resilient arm 121. A driven-to-move piece 64 is protruded from the retainer 6 which/that then penetrates through the operational hole 52. The holder 7 is pivotally connected to a bottom of the main body 1 which is hung on the user's ear.

Figure 4:
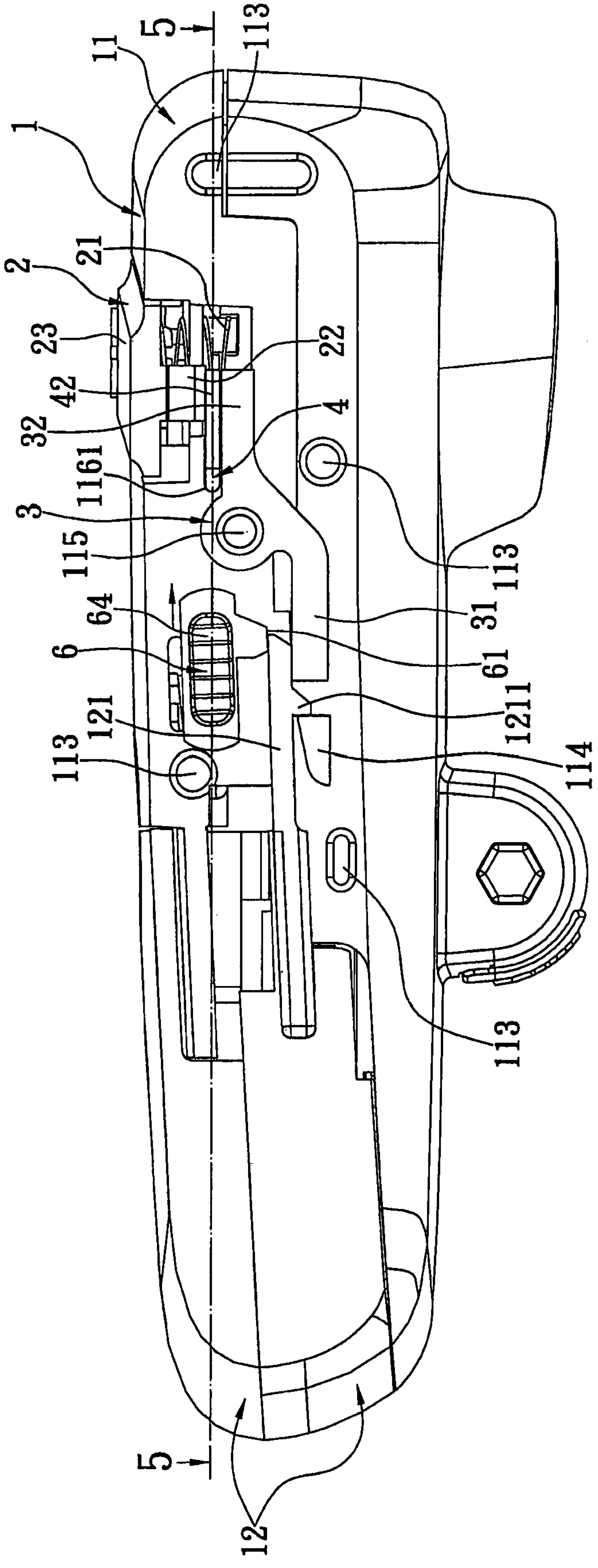
FIG. 4 is a schematic view of a first action in operating the slidable Bluetooth earphone structure according to one embodiment of the invention.
Figure 5:
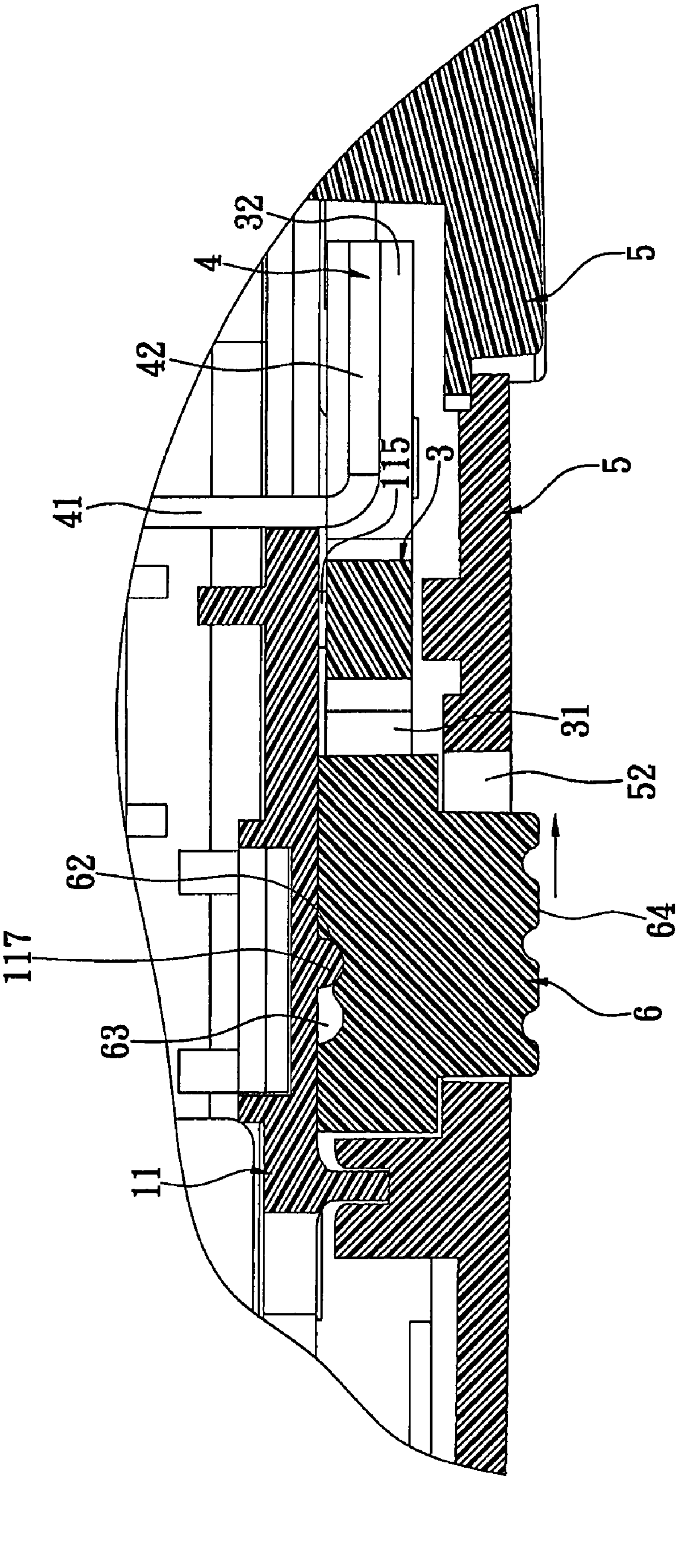
FIG. 5 is a schematic view of a second action in operating the slidable Bluetooth earphone structure according to one embodiment of the invention.

In one of the embodiment of the invention, as shown in FIG. 2, FIG. 3, FIG. 4, and FIG. 5, when the earphone of the present invention is in an ideal position, the user can push the driven-to-move piece 64 of the retainer 6 to slide forward until the driven-to-move piece 64 reaches the first slot 62 of the retainer 6 and engages with the positioning rib 117. At this moment, the retainer 6 is positioned at the upper end of the resilient arm 121 to drive the retaining face 61 to be close to the resilient arm 121 so that the resilient arm 121 is retained, this prevents the resilient arm 61 from being bumped due to the pushing force exerted by the first rotatable arm 31. When in use, the user pushes the driven-to-move piece 64 of the retainer 6 to slide backward until the second slot 63 of the retainer 6 engages with the positioning rib 117, so that the retainer 6 departs from the upper end of the resilient arm 121 and the resilient arm 121 is thus no longer retained.

Figure 6:
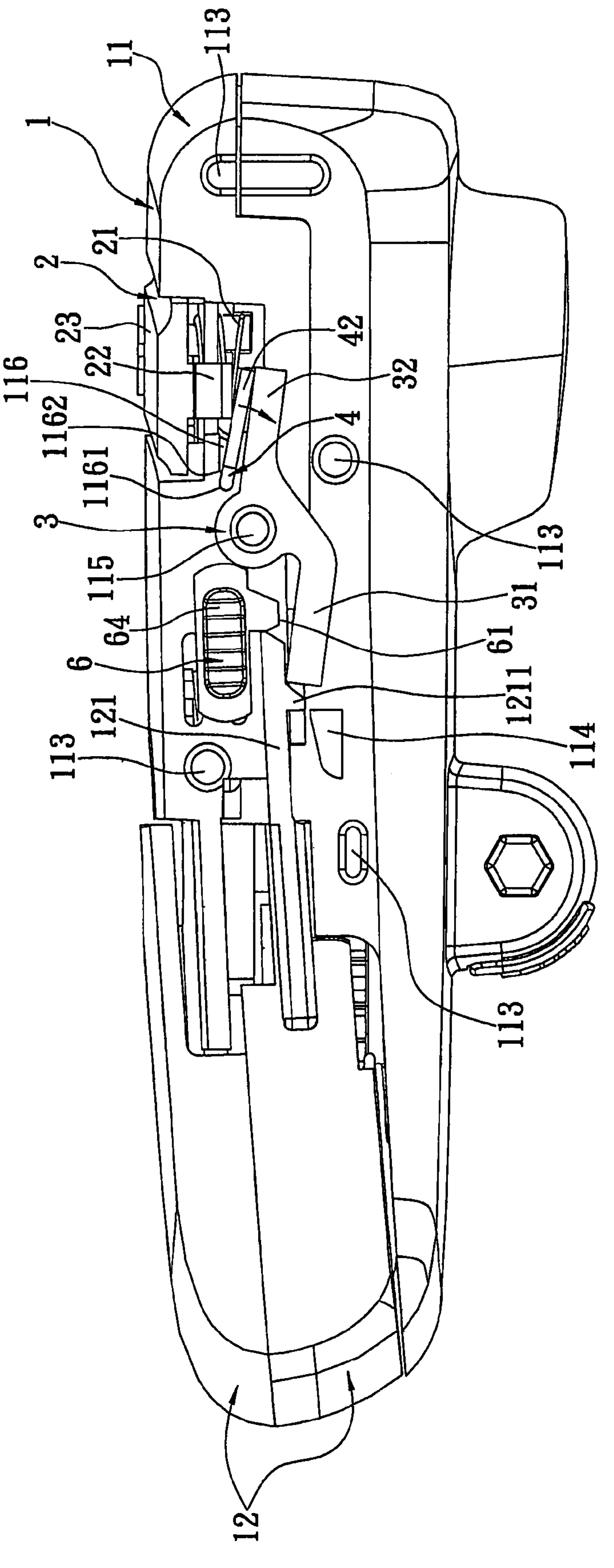
FIG. 6 is a schematic view of a third action in operating the slidable Bluetooth earphone structure according to one embodiment of the invention.
Figure 7:
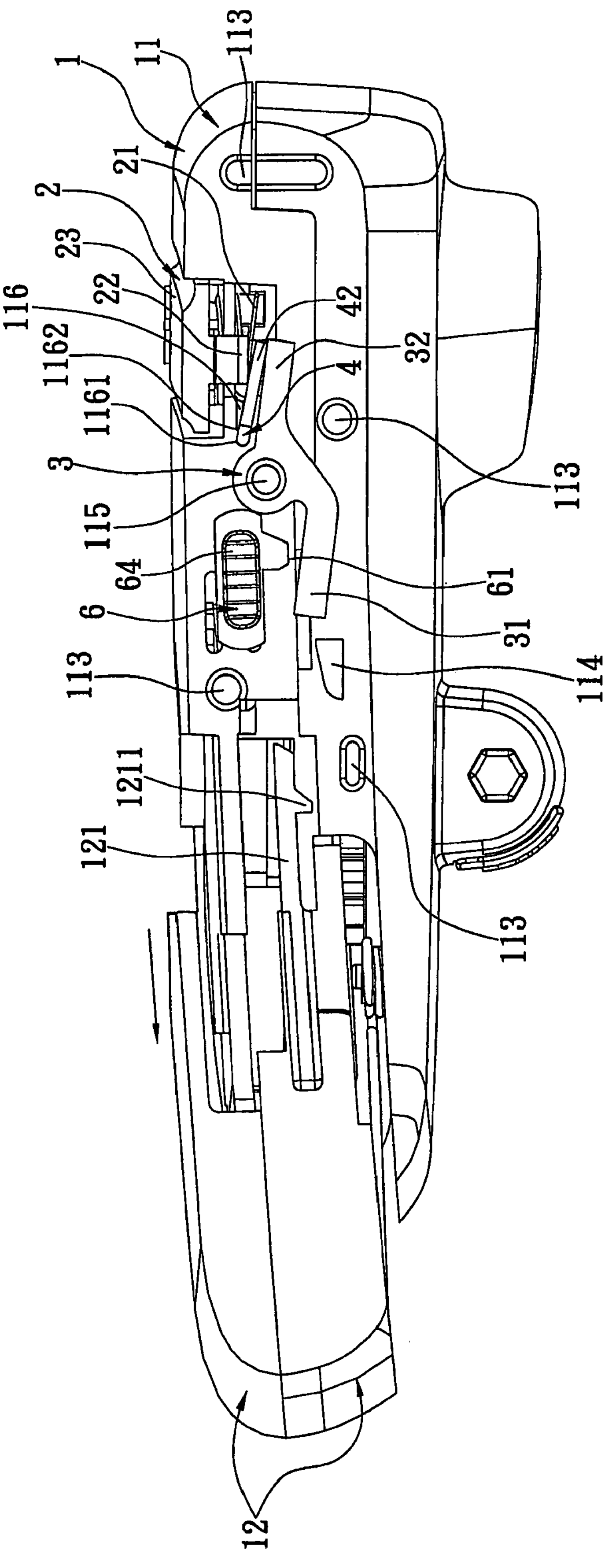
FIG. 7 is a schematic view of a fourth action in operating the slidable Bluetooth earphone structure according to one embodiment of the invention.

As shown in FIG. 2, FIG. 3, FIG. 6 and FIG. 7, after the retainer 6 releases the resilient arm 121, the user presses down the pressing face 23 of the pressing element 2. Since the pressing element 2 is across the first body 11, any area of the pressing face 23 can be pressed for operation, as long as the stopping piece 22 on any one of the sides of the pressing element 2 can be pushed against the stopping rod 42 thereunder. By means of pushing the stopping piece 22 against the stopping rod 42, the main axis 41 of the connector 4 is driven to rotate so that the stopping rods 42 on both sides of the connector are driven to be against the respective second rotatable arms 32. At this moment, the rotating pieces 3 on both sides of the first body 11 are driven to rotate, and the two first rotatable arms 31 are pushed upward against the respective resilient arms 121 so that the flanges 1211 of the resilient arms 121 move upward accordingly to withdraw from the positioning piece 114. Therefore, the second body 12 is released free and pushed by the sliding mechanism 14 to move forward relative to the first body 11.

In view of the above description, the invention provides advantages over the prior art, such as:

1. When the user pushes the pressing element 2 down to drive the connector 4 for action, the rotating pieces 3 on both sides of the first body 11 can be driven to rotate downward only by pushing the stopping piece 22 on one side of the pressing element 2 against the pressing rod 42 (i.e. the connector 4 is pushed downward) even if the pushing force upon the pressing element 2 is unevenly exerted. Thereby, the resilient arms 121 on both sides of the second body 12 are released from the limiting position so that the second body 12 can freely slide. During the operation, the user can easily use the sliding function of the earphone of the present invention without paying great attention to find the location where the force is to be exerted on the pressing element 2.

2. The retainer 6 is configured to provide a retaining mechanism for the sliding function of the earphone. Therefore, any actuation of the sliding function of the earphone according to the present invention due to unintentional operation of the pressing element 2 can be avoided.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. A slidable Bluetooth earphone, comprising:

a main body, having a first body in which there is an accommodating space, the accommodating space having a sound transmission device mounted inside thereof, a pair of positioning pieces being oppositely protruded from both lengthwise sides of the first body, a second body being formed at a front end of the first body, a resilient arm being formed at each opposite side of the second body and extending backward to the positioning piece, a flange being formed on a bottom of the resilient arm, and a sliding mechanism being mounted between the first body and the second body;

a pressing element, mounted on the first body, wherein a stopping piece extends downward from the pressing element along each lengthwise side of the first body;

two rotating pieces, respectively pivotally connected to the sides of the first body, wherein a first rotatable arm extends forward from a front end of the rotating piece and is located under the resilient arm, and a second rotatable arm extends backward from a rear of the rotating piece and is located just under the stopping piece and in the movement path of the pressing element; and a connector, having a main axis penetrating the first body, wherein a stopping rod extends from each end of the main axis and is located between the stopping piece and the second rotatable arm;

wherein a retainer is formed on at least one side of the first body and moves relative to the first body, a retaining face is formed on a bottom of the retainer in a manner that the retaining face coming close to the resilient arm as the retainer slides over an upper end of the resilient arm which is located on the same side as where the retaining face is formed; and, a positioning rib is formed on one side of the first body, and at least two slots are formed opposite to the first body but corresponding to the positioning rib, as soon as one of the slots comes to engage with the positioning rib, the retainer is positioned at an upper end of the resilient arm to drive the retaining face to be close to the resilient arm, and as soon as the second slot comes to engage with the positioning rib, the retainer departs from the upper end of the resilient arm so as to drive the retaining face to depart from the resilient arm.

2. The slidable Bluetooth earphone of claim 1, wherein a stub is formed on each side of the first body for the rotating piece to pivotally connect with the stub.

3. The slidable Bluetooth earphone of claim 1, wherein a pair of sliding holes are oppositely formed through both sides of the first body for the main axis of the connector to penetrate through.

4. The slidable Bluetooth earphone of claim 3, wherein a movable space is formed at one end of each sliding hole, at least one positioning protrusion is formed on inner sides of the sliding holes close to the movable space to limit the main axis.

5. The slidable Bluetooth earphone of claim 4, wherein a pair of positioning protrusions are oppositely formed on inner sides of the sliding holes close to the movable spaces.

6. The slidable Bluetooth earphone of claim 1, wherein two shields respectively shield both opposite sides of the first body, an operational hole is formed through one of the shields, and a driven-to-move piece is protruded from the retainer which penetrates through the operational hole to drive the retainer to slide.

7. The slidable Bluetooth earphone of claim 6, wherein a plurality of fixing pieces are formed on both lengthwise sides of the first body, and a plurality of fixing slots are formed on the shields so as to receive the respective fixing pieces.

8. The slidable Bluetooth earphone of claim 6, wherein two shields respectively extend to cover both sides of the second body, a limiting slot is formed on each of the shields opposite to the second body in a manner to receive the resilient arm on the second body.

9. The slidable Bluetooth earphone of claim 1, wherein a holder is pivotally connected to a bottom of the main body of the earphone.

* * * * *